United States Patent Office 3,345,747
Patented Oct. 10, 1967

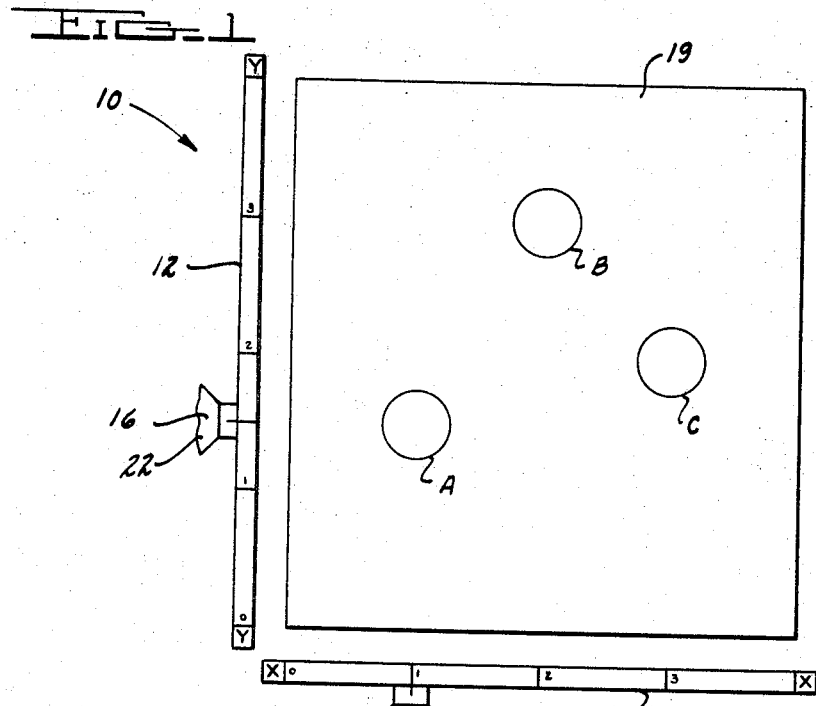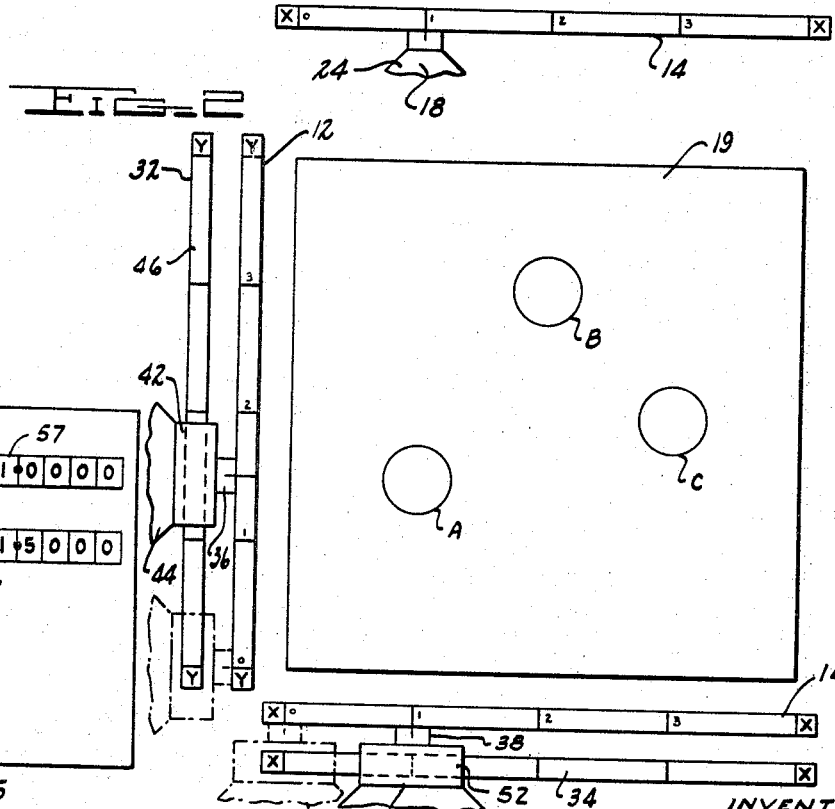

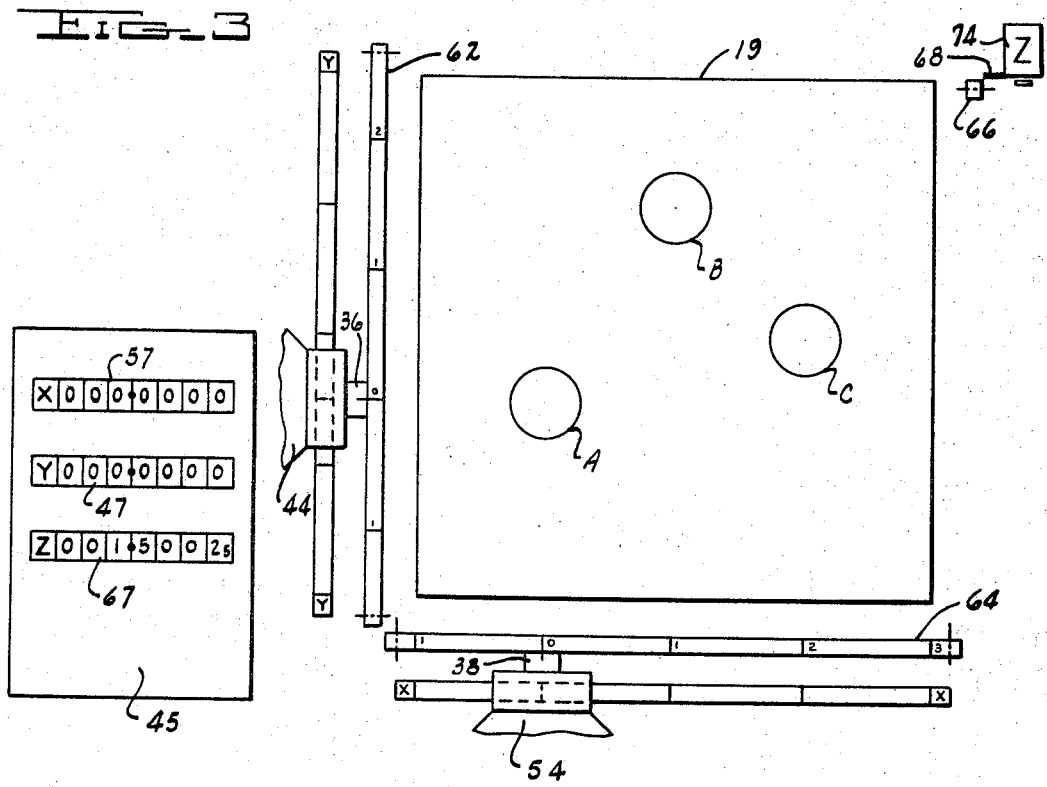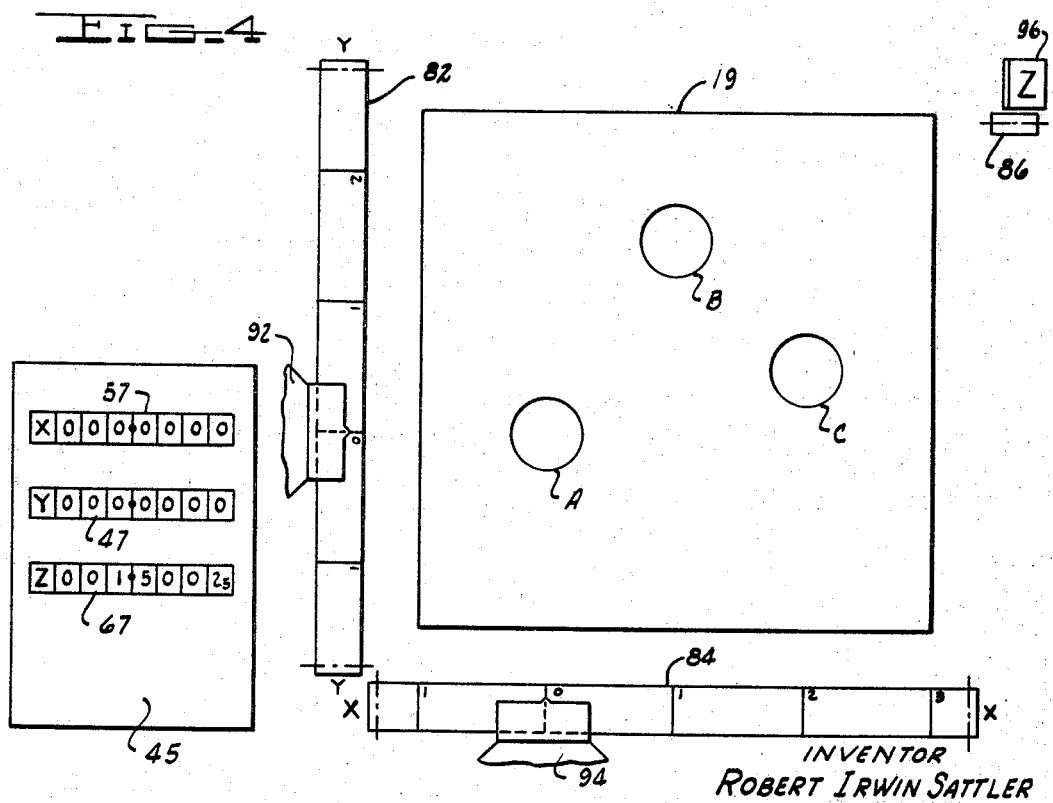

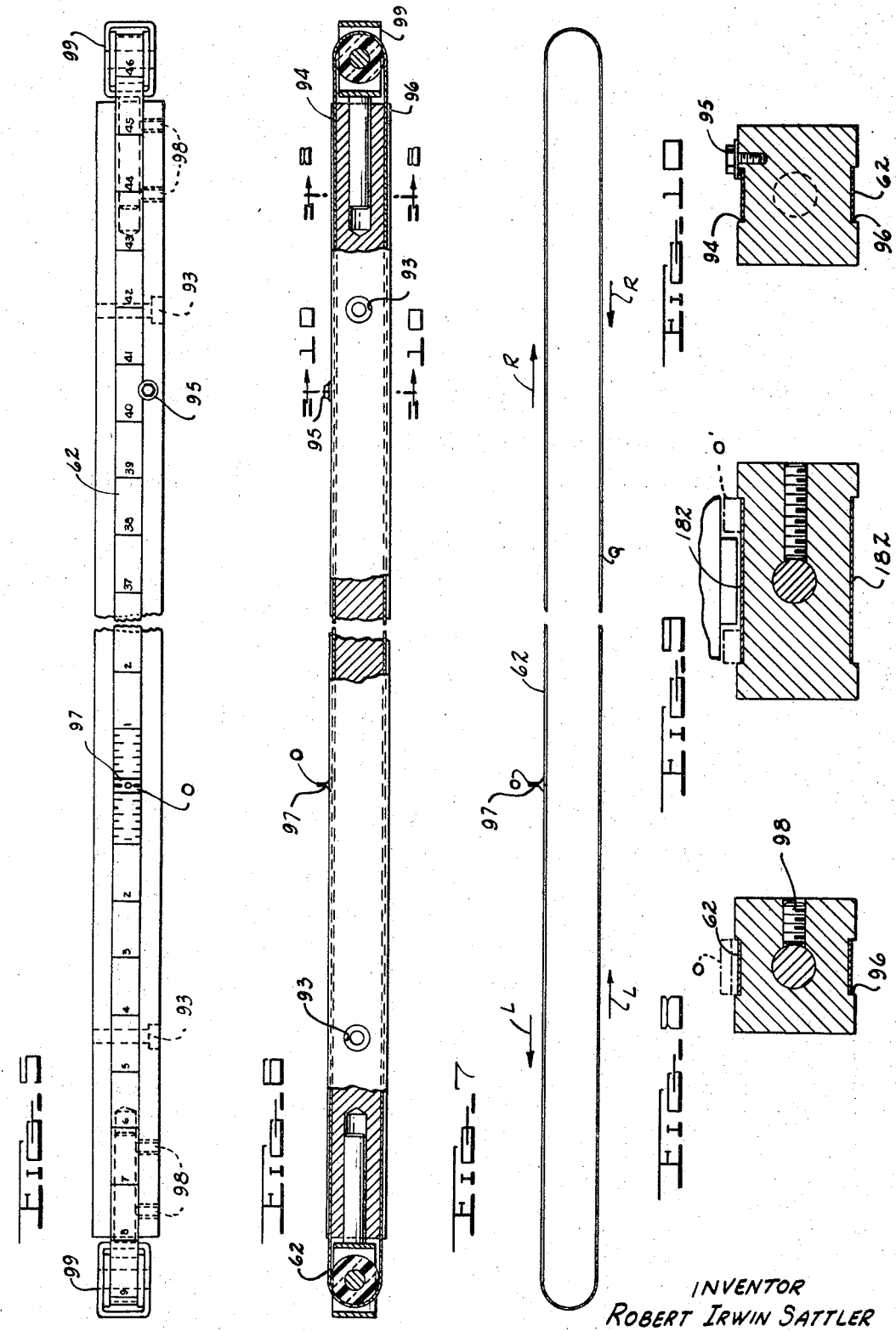

3,345,747
MECHANICAL COORDINATING DEVICE
Robert Irwin Sattler, St. Clair Shores, Mich., assignor to
La Salle Machine Tool, Inc., Warren, Mich.
Filed Mar. 9, 1964, Ser. No. 350,288
2 Claims. (Cl. 33—1)

ABSTRACT OF THE DISCLOSURE

Locating apparatus for machine tools and the like utilizing remotely readable scales and corresponding mechanical verification scales and wherein the scales have adjustable zero points which can be set for a given machining operation at the position which most facilitates subsequent tool locations by the operator.

Background of the invention

In industries, such as the machine tool industry, substantial effort has been expended in an attempt to provide a simple and accurate means of coordinating measuring operations and it is to such a structure that the present invention is directed. While it has been found that electronic and optical measuring devices provide very accurate results under a given set of circumstances, these devices do not reduce sufficiently the likelihood of human error. Furthermore, these devices are laborious to watch continuously and do not provide a readily adjustable zero point from which distances can readily be measured without mathematical computations.

Summary of the present invention

The present invention utilizes a remotely readable scale which includes a length of accurately calibrated steel strip which is disposed over the distance within which measurements are to be made. The calibrations on the steel strip take the form of a grating pattern. Each of the graduated calibrations are spaced in predetermined relationship and are etched on the polished surface of the steel strip. The calibrated graduations are at right angles to the edge of the steel strip. An electronic readout system is used in conjunction with the steel strip. The readout system has a glass index grating therein, along with a number of light sensitive elements. When a beam of light is passed through an optical system, also contained in the readout system, it is reflected from the polished surface of the steel strip into the light sensitive elements, which causes a signal to be generated in accordance with the grating pattern. Therefore, as the readout optical system is moved with respect to the steel strip, a signal is generated in accordance with the relative displacement of the respective elements. The generated signal is then recorded and is visible on a remote screen. A calibrated scale, for which a readout unit is provided, is installed in each plane where measurement is desired.

In this invention, the recorded signal, which is visible on a screen, may be set to a new zero reading at any time, however, during subsequent movement the system will provide a continuous recording of the distance traversed from the last set zero point. This ability to move the zero point is used to reduce the adding and subtracting which the machine operator is required to do. In addition this invention combines a direct reading mechanical verification scale with each readout unit. Each direct reading scale consists of a calibrated member with a zero reference point mounted so that the zero point can be moved to a point corresponding to the zero on the readout unit. After the zero points are established, the machine operator can at any time quickly move the machine to approximately the desired work point each time by watching the direct reading scale. The operator can then switch his attention to the screen for the readout unit to precisely locate the machine.

It is an object of this invention, therefore, to provide improved locating apparatus in which direct reading mechanical verification scales are combined with corresponding remotely readable scales and in which the scales have adjustable zero points to facilitate their practical use.

In the drawings:

FIGURE 1 illustrates a schematic drawing of a measurement coordinating device which incorporates a single calibrated scale on each axis or plane of operation.

FIGURE 2 shows a schematic drawing of a measurement coordinating device which incorporates two calibrated scales on each axis or plane of operation, wherein an electronic readout system is employed.

FIGURE 3 illustrates a schematic drawing of a measurement coordinating device, similar to FIGURE 2, wherein two calibrated scales are used on each of three axes of operation.

FIGURE 4 shows another schematic drawing of a measurement coordinating device, wherein a single calibrated scale is used in each of three planes of operation, each of said calibrated scales being adjustable and cooperable with a visual readout system.

FIGURE 5 is a plan view of an adjustable scale as incorporated in the structure shown in FIGURE 3 to provide a mechanical check of the electronic readout system.

FIGURE 6 is an elevational view of the adjustable scale shown in FIGURE 5, partially broken away for purposes of clarity.

FIGURE 7 is an elevational view of the adjustatble scale shown in FIGURES 5 and 6.

FIGURE 8 is a cross section taken along lines 8—8 of FIGURE 6.

FIGURE 9 is a cross section of a modified form of the present invention, in accordance with the structure shown in FIGURE 4 of the drawings.

FIGURE 10 is a view of a clamping device, taken along lines 10—10 of FIGURE 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As has been previously stated, the present invention relates to new and useful improvements in mechanical measurement control and more particularly to a mechanical measurement coordinating device. FIGURE 1 of the drawings illustrates a schematic drawings of a mechanical measurement coordinating device 10, used in the locating apparatus of this invention, wherein two graduated scales 12 and 14 are positioned adjacent a workpiece 19. Scale 12 is positioned on the vertical or "Y" axis, while scale 14 is located on the horizontal or "X" axis. A pointer or vernier 16 is secured to a movable member 22 which operates on the "Y" axis and a second pointer or vernier 18 is secured to another movable member 24. While only a minimum number of graduations are shown on the drawings, it is to be understood that each of the graduated scales 12 and 14 are calibrated in predetermined increments which extend across the scales and from end to end. The pointers or indexes 16 and 18 are etched in the manner of a vernier, therefore affording a high degree of accuracy. It will also be understood that the vernier can be magnified, should the need arise, without departing from the spirit of the invention.

It will also be noted in FIGURE 1 of the drawings that the zero base reading of the "Y" axis is in alignment with the bottom edge of the workpiece 19, while the zero base reading of the "X" axis is in alignment with the left edge of the workpiece. In the present instance, while no actual mechanism is illustrated to make the holes in the workpiece, the coordinating device is used merely to locate the exact location of the several openings, when the coordinating device is secured to a given machine.

The openings A, B, C, are located on the X axis at 1.0, 2.0, and 3.0 respectively, while the Y axis coordinates are 1.5, 3.0 and 2.0 respectively. The same coordinates are used in all four figures which illustrate the workpiece 19, however, in FIGURES 3 and 4 where the Z axis is shown, the Z coordinate is 1.5 in both instances, and when carried out five decimal places is 001.50025.

In FIGURE 2 of the drawings, one form of the present invention is illustrated. The workpiece 19 is shown with three openings A, B and C, each of which is located in the same position as described in connection with FIGURE 1. Immediately adjacent to left edge of the workpiece are positioned two graduated scales, namely, a mechanical verification scale 12 and a remotely readable scale 32. Each of the scales are located in parallel relationship to each other as well as the edge of the workpiece 19, and form the Y axis. Two additional scales, namely, a mechanical verification scale 14 and a remotely readable scale 34 define the X axis, which is in parallel relationship to the bottom edge of the workpiece 19. Scales 14 and 34 are parallel to each other and with the bottom of the workpiece, thus making the X axis perpendicular to the Y axis. A pointer or vernier or index 36 is secured to a movable sensing member 42 which houses an electronic pulse counter 44. The pulse counter 44 is positioned in spaced relationship to the polished surface 46 of the graduated or calibrated scale 32. The graduations on the scale 32 are in the form of a grating pattern of accurately spaced lines that are etched on the polished surface 46. The electronic pulse counter 44 contains a glass grating, along with an optical system and a group of light sensitive elements (not shown). When a beam of light is emitted from an exciter lamp in the optical system, it is reflected from the polished surface 46 of the scale 32 into the light sensitive elements, so as to generate a signal. This permits the graduated lines to be detected when the pulse counter 44 is moved over them.

Four pulses are obtained for movement through one grating pitch. Therefore, each pulse represents a given increment relative to the displacement of the respective pulse counter 44 and the scale 32. If the scale grating has a line structure of 250 lines per inch, each pulse represents a displacement of $\frac{1}{4} \times \frac{1}{250} = 0.001$ inch. If the scale grating structure is 1000 lines per inch, each pulse represents a displacement of $\frac{1}{4} \times \frac{1}{1000} = 0.00025$ inch. From the above description, it is now readily apparent that the accuracy of relative displacement is dependent on the scale grating on the polished surface 46 of the scale 32. The graduations on the polished surface 46 are therefore of the utmost importance and must be located with a high degree of accuracy. This procedure is of course very costly.

Returning now to the X axis on which scales 14 and 34 are located, we note that scale 14, like scale 12 is calibrated throughout its full length. In addition, each scale is provided with suitable indicia. A pointer or vernier 38 is secured to a movable sensing member 52 which houses an electronic pulse counter 54. The pulse counter 54 is positioned in spaced relationship to the polished surface 56 of the graduated or calibrated scale 34. The electronic pulse counter 54 is of the same structure as that described in connection with pulse counter 44 and operates in the same manner.

Now, as the movable pulse counter 44 moves along the Y axis, the vernier or index 36 carried thereby mechanically indicates the position of the movable member, relative to the zero base reading on scale 12, while the electronic position is recorded on the screen 47 of the visible readout 45, from the same zero base reading. As the movable pulse counter 54 moves along the X axis, the vernier 38 carried thereby mechanically indicates the position of the movable member, relative to the zero base reading on scale 14, while the electronic position is recorded on screen 57 of the visible readout 45, from the same zero base reading. The construction illustrated thereby affords a double check of all coordinates and thus avoids the possibility, or at least limits the possibility of possible error.

It can thus be seen that a machine operator desiring to machine holes A, B and C can quickly locate the machine tool at approximately the desired position by focusing his attention on the mechanical verification scales 12 and 14. By then shifting his attention to the readout screens 47 and 57, the operator can precisely locate the machine and known that this location is accurate because it is verified by the scales 12 and 14.

The illustration shown in FIGURE 3 of the drawings is similar to that shown in FIGURE 2, except that scale 62 on the Y axis is adjustable. Scale 64 on the X axis is also adjustable, as is scale 66 on the Z axis, Electronic pulse counters 44, 54 and 74 are provided on the Y, X and Z axes respectively. As has been previously described, verniers or pointers 36, 38 and 68 are carried by the movable pulse counters and they cooperate with the adjustable scales 62, 64 and 66 respectively. Upon displacement of the movable members along the X, Y and Z axes, the relative displacement is recorded on the screens 47, 57 and 67 of the readout 45, which reading can be checked against the adjustable zero base reading.

The adjustable zero settings on the mechanical verification scales 62 and 64 and the readout screens 47 and 57 thus enable the machine operator to locate the holes A, B and C with a minimum requirement for mathematical computations by the operator.

In FIGURE 4 of the drawings, a three axis device is shown. A single adjustable scale is used on each of the axes. Scale 82 is on the Y axis, scale 84 on the X axis and scale 86 is on the Z axis. Pulse indicators 92, 94 and 96 are positioned (movable) on each of the respective axes and are adapted to pick up and multiply if necessary a signal from the adjustable scale. This is accomplished by means of an endless belt of magnetic tape, on which a predetermined signal has been recorded. For example, if a recorded signal of 15,000 cycles per second were recorded on a magnetic tape, using commercial equipment having a tape speed of 15 inches per second, we would have a calibrated tape with an equivalent signal of 1000 pulses per inch. If the same recorded signal of 15,000 cycles per second were placed on a tape having a speed of 7.5 inches per second, we would then have a calibrated tape with an equivalent signal of 2,000 pulses per inch. This of course would be very simple to accomplish, the results would be very accurate and the cost would be but a fraction of that encountered when the polished calibrated scale were used.

To provide the mechanical check of the electronic device, one would merely print any desired indicia on the tape and provide a pointer on the movable member.

While the tape is shown as being solid, without means for adjustment, this can be readily accomplished by perforating the tape as done on a movie film. A myriad of other ways might also be used, without departing from the scope of this invention. When the signal is detected, through displacement of the respective members, the signal generated is recorded on the screens 47, 57 and 67 of the readout 45.

FIGURE 5 shows a flexible scale 62 mounted in a bar having two longitudinal grooves 94 and 96 therein, which guide the edges of said scale. The scale 62 is disposed over two adjustable rollers, one on each end of said bar. Set screws 98 are provided for positioning the rollers, which are positioned in a cage 99 that has a stem which extends into each end of the bar. The scale 62 which is calibrated in two directions from the zero point is positioned around the rollers and in parallel relationship to the bar. The ends are joined to form an endless belt, followed by adjustment of the set screws 98 to eliminate any looseness. A plurality of openings 93 are provided in the bar to permit the assembly to be secured to a machine element. A clamp 95, is provided to prevent accidental displacement of the scale 62, once the scale is adjusted for a given set of conditions. A pointer 97 is provided to permit adjustment of the scale 62 when the clamp device 95 is released.

FIGURE 6 is a cross section (partial) of the structure shown in FIGURE 5 and is identified by the same numerals. The structure illustarated is merely for the purpose of illustration, since this might be accomplished in many ways without departing from the spirit of the invention.

FIGURE 7 is a view of the endless tape or flexible scale 62 in elevation. The scale 62 has indicia thereon starting point O, from right to left, ending at Q as shown by the direction of the arrows R. In addition, the scale 62 has indicia thereon starting from point O, from left to right, ending at the joint of Q, as shown by the direction of the arrows L.

FIGURES 8 and 10 are cross sections taken along the lines 8—8 and 10—10 of FIGURE 6, and illustrate the set screw 98 positioning means for the scale 62, as well as the clamping means 95. The clamp means is merely a screw and washer, with perhaps a small amount of friction material between the washer and the scale 62.

FIGURE 9 shows another form of the present invention, wherein a single scale 182 is used. The scale 182 is, in the form of a plastic or a metal tape which has a sound track thereon on which a pre-determined signal has been applied. The sound track can be single or multiple and is generated under controlled conditions such as previously described in connection with FIGURE 4. While a pre-determined signal can be put on tape magnetically, without necessity of lined calibrations (1000 per inch), it must also be understood that a single or multiple wire might also be substituted for the magnetic tape. In addition, the magnetic tape, can if necessary be calibrated so as to permit its use in the same manner as the scales described in conection with FIGURES 1-3. Also, the sound track can be applied, or otherwise cut as is done in the manufacture of records.

From the foregoing description, it is apparent that the measurement coordinating device of the present invention is simple and durable and it affords a method and apparatus for coordinating measuring operations which heretofore has presented a serious problem.

Having thus described my invention, I claim:

1. In a machine tool positioning system, locating apparatus comprising a first scale extending along a first axis and having a grating pattern, a second graduated scale spaced from and parallel to said first scale, a first means for sensing positions along said first scale and including an index alignable with the graduations on said graduated second scale for obtaining corresponding readings from said first and second scales, a first visible screen readout for indicating the position of said first sensing means relating to said first scale, a third scale extending along a second axis and having a grating pattern, a fourth graduated scale spaced from and parallel to said third scale, a second means for sensing positions along said third scale and including an index alignable with the graduations on said graduated fourth scale for obtaining corresponding readings from said third and fourth scales, a second visible screen readout for indicating the position of said second sensing means relative to said third scale, each of said scales having a zero reference point and being adustable to locate the position of the zero reference point thereon relative to a fixed point.

2. Locating apparatus according to claim 1 wherein each of said graduated scales includes an endless member having a zero reference and calibrations marked thereon, a pair of spaced rollers, said endless members being trained about said rollers so that movement of said endless member is operable to adjust the position of said zero reference.

References Cited

UNITED STATES PATENTS

| | | | |
|---|---|---|---|
| 2,295,000 | 9/1942 | Morse | 33—125 |
| 2,311,142 | 2/1943 | Turrettini | 33—125 |
| 2,353,726 | 7/1944 | Guttmann | 33—189 X |
| 2,618,860 | 11/1952 | Engelhart | 33—189 |
| 2,628,539 | 2/1953 | Neergaard | 33—125 |
| 2,720,810 | 10/1955 | Senn | 33—1.0 |
| 2,948,890 | 8/1960 | Barth et al. | 33—1.0 |
| 3,001,081 | 9/1961 | Bower | 33—125 |
| 3,227,884 | 1/1966 | Bantsch et al. | 33—125 |

FOREIGN PATENTS

| | | |
|---|---|---|
| 1,138,436 | 1/1957 | France. |

LEONARD FORMAN, *Primary Examiner.*

WILLIAM D. MARTIN, *Assistant Examiner.*